United States Patent
Berstis et al.

(10) Patent No.: US 6,509,827 B1
(45) Date of Patent: Jan. 21, 2003

(54) METHOD AND APPARATUS FOR POSTPONED PAGER SERVICE FOR AIRLINES

(75) Inventors: Viktors Berstis, Austin, TX (US); Maria Azua Himmel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,957

(22) Filed: Jan. 29, 1999

(51) Int. Cl.$^7$ ................................................ H04Q 5/22
(52) U.S. Cl. ................... 340/7.52; 340/7.22; 340/7.26; 340/7.2; 455/67.1; 455/412; 455/517; 379/265.11
(58) Field of Search ........................ 340/825.44, 7.22, 340/7.26, 7.52; 455/517, 412, 522, 67.1; 379/265.11

(56) References Cited

U.S. PATENT DOCUMENTS

| | | | | |
|---|---|---|---|---|
| 4,178,476 A | * | 12/1979 | Frost | 340/7.27 |
| 5,754,946 A | * | 5/1998 | Cameron et al. | 455/38.1 |
| 5,809,428 A | * | 9/1998 | Garahi et al. | 455/517 |
| 5,841,854 A | * | 11/1998 | Schumacher et al. | 379/265.11 |

* cited by examiner

Primary Examiner—Brian Zimmerman
Assistant Examiner—Yves Dalencourt
(74) Attorney, Agent, or Firm—Duke W. Yee; Jeffrey S. LaBaw; Stephen R. Tkacs

(57) ABSTRACT

A method and apparatus for receiving postponing reception of data by a pager during an airline flight. A pager is registered prior to the beginning of an airline flight. A data collector monitors for data directed to the pager. Responsive to detecting data directed to the pager, the data is stored. Responsive to a termination of the airline flight, the data is transmitted to the pager at the destination by a transmitter.

25 Claims, 3 Drawing Sheets

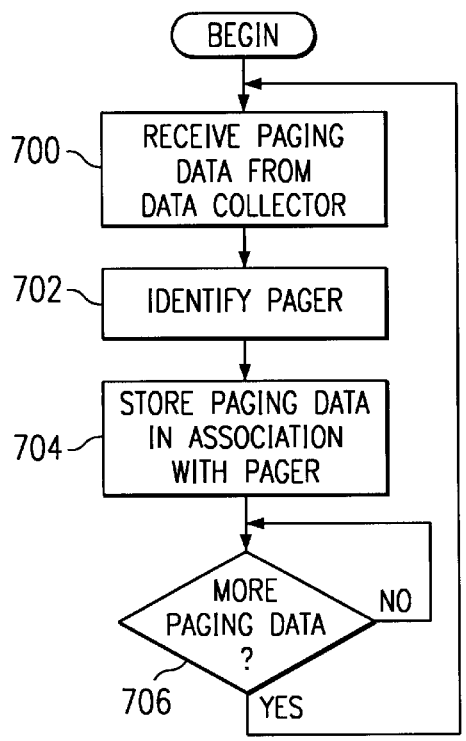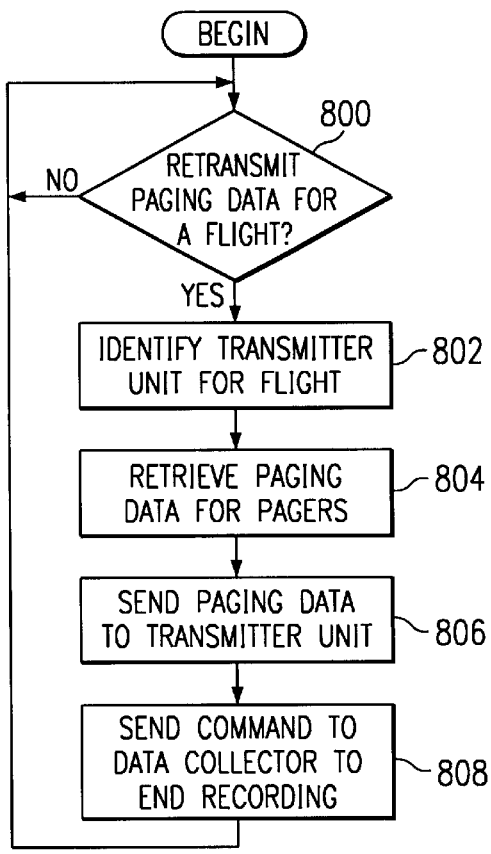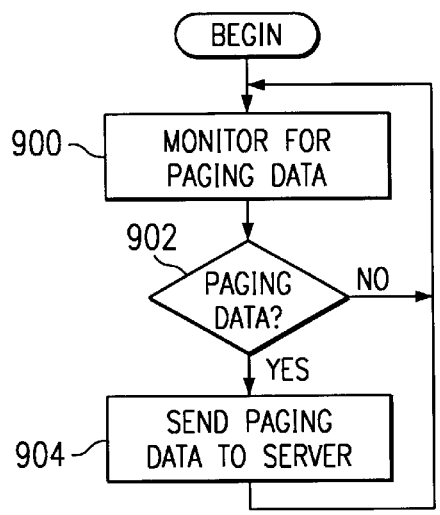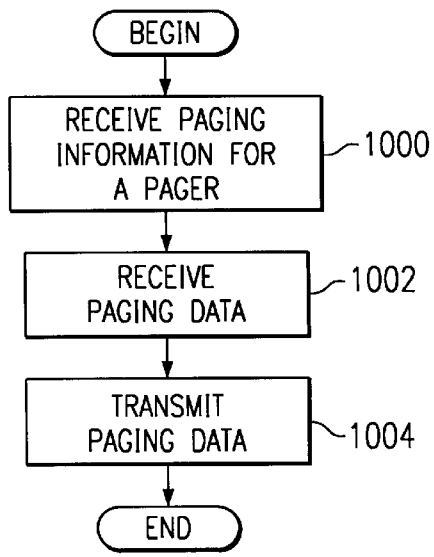

METHOD AND APPARATUS FOR POSTPONED PAGER SERVICE FOR AIRLINES

BACKGROUND OF THE INVENTION

1. Technical Field

The present invention relates generally to a paging system and in particular to a method and apparatus for postponing pager service. Still more particularly, the present invention relates to a method and apparatus for postponed pager service for airlines.

2. Description of Related Art

Communication systems in general, and paging systems in particular, have obtained wide spread use in today's society. In such paging systems, transmitted call signals are used to call selected receivers for the purpose of transmitting information from a base station to the selected receivers. Modern paging systems employ receivers with multifunction capabilities through the use of microprocessors. These microprocessors allow the receivers to respond to information containing various combinations of tone, tone and voice, or data messages in a number of different modes. This information may be transmitted using several known paging-coding schemes and message formats.

Today, the trend in paging communication is to provide larger and larger geographic coverage to provide customer's who travel an ability to receive messages over vast geographic areas. Nationwide paging systems are often contemplated in an attempt to provide paging messages to customers without regard to where they are in a country, such as, for example, the United States. In this regard, various paging systems, including satellite based global paging communication systems, have been put in place to allow a user to receive a page almost anywhere.

A problem, however, still exists with paging systems with respect to users who travel over large geographic areas. Specifically, commercial airlines typically disallow the use of pagers, cellular phones, and other electronic devices during flight. In this instance, the turning off of the pager prevents the user from receiving a page at the receiver. In addition, the fuselage of an aircraft also acts as a shield to prevent incoming pager signals from penetrating the interior of the aircraft. Thus, a user while on a plane may miss any number of pages. Such a situation is undesirable to users who rely on these receivers to receive messages.

Therefore, it would be advantageous to have an improved method and apparatus for avoiding loss of pages for users who are on an aircraft.

SUMMARY OF THE INVENTION

The present invention provides a method and apparatus for receiving postponing reception of data by a pager during an airline flight. A pager is registered prior to the beginning of an airline flight. A data collector monitors for data directed to the pager. Responsive to detecting data directed to the pager, the data is stored. Responsive to a termination of the airline flight, the data is transmitted to the pager at the destination by a transmitter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart of a process for receiving paging data in accordance with a preferred embodiment of the present invention;

FIG. 8 is a flowchart for transmitting data in accordance with a preferred embodiment of the present invention;

FIG. 9 is a flowchart of a process used by a data collector to receive or record paging data in accordance with a preferred embodiment of the present invention; and FIG. 10 is a flowchart of a process for transmitting postponed pages in accordance with a preferred embodiment of the present invention.

DETAILED DESCRIPTION OF THE PREFERRED EMBODIMENT

The present invention provides a method, apparatus, and instructions for postponing or forwarding data to a pager at a later time. The present invention provides this advantage through a mechanism in which a user may register the user's pager. This may be done while entering the airplane or by profile data in the airline's flier database. The registration in the depicted example occurs when a boarding pass is read prior to a passenger entering a jetway to board the aircraft. Other mechanisms also may be used to register a pager, such as a barcode or any number of electronic means. Once registered, a receiver device, also referred to as a data collector, records all pages directed towards the pager's owned by passengers that are onboard the flight. These pages are forwarded to the destination airport, or can be collected there if paging information is transmitted to the destination airport over a network, such as the Internet, an intranet, or through other electronic communications links.

After stopping at the arrival gate, the passengers would be instructed to turn the pagers on with the collected pages then being retransmitted to the pagers. This retransmission may occur in the interior of the aircraft or on the jetway, such that each user can receive any pages that may have occurred during the flight.

Figure 1:
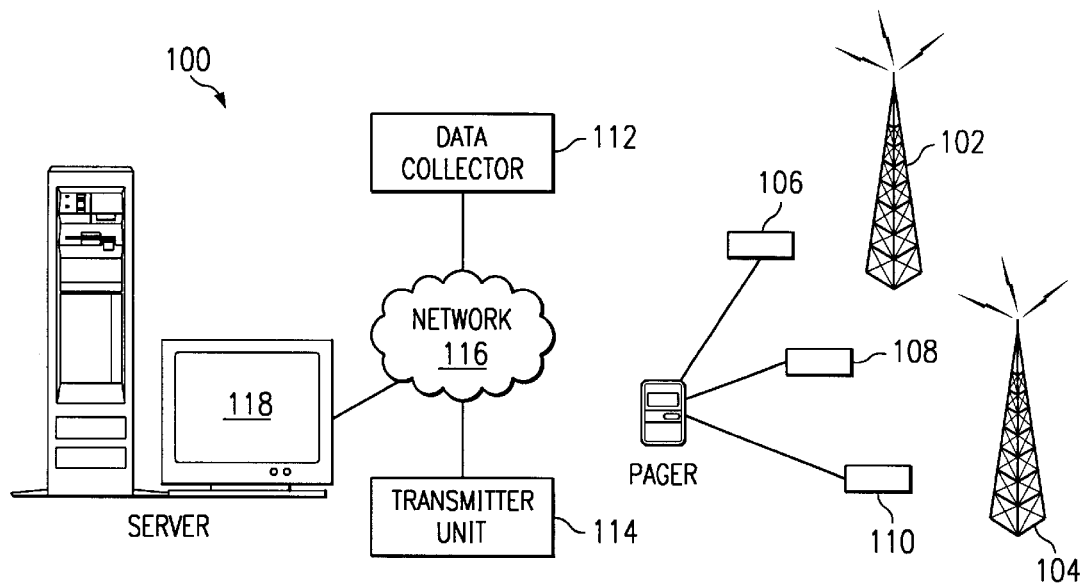
FIG. 1 is a diagram of a communications system in accordance with a preferred embodiment of the present invention.

With reference now to the figures and in particular with reference to FIG. 1, a diagram of a communications system is depicted in accordance with a preferred embodiment of the present invention. In the depicted example, communications system 100 for purposes of the following description can be any type of radio communication system, but more specifically for the purposes of this description, communications system 100 is a paging system.

Within communications system 100, a number of different paging mechanisms may be employed. Many types of coding schemes including single or multi-toned signals select a combination of tone and voice signals and visually decoded signals may be implemented. In addition, digitally and coded signals also may be employed within communications system 100 for sending paging data or pages to a pager. The paging data or pages may include data, such as text or numbers and/or audio data, such as a voice message.

Communications system 100 includes central control stations 102 and 104, which are also referred to as terminals. These control stations send information to receivers, such as pagers 106, 108, and 110 over a service area also referred to as a coverage area. Central control stations 102 and 104 each are connected to a computer system with the appropriate memory and input capabilities coupled to a communications transmitter in order to transmit information messages to various receivers, such as pagers 106–110.

Pagers are generally small, portable, battery-operated radio receivers, designed to be carried on the person of a user. The technique used in paging systems is referred to as selective calling in which transmissions intended for a particular receiver will call a response only in that receiver. This selective calling capability is achieved by assigning each pager one or more unique address codes, which are encoded and modulated over the carrier wave. Each pager includes a decoding portion designed to cause a response only to its assigned address code or codes. If one of the address codes is detected, the pager is activated to produce a corresponding alert signal. Normally, none of the other pagers in the communication system will be activated by that transmission unless the system has a group call operation. Paging data received by the pager is decoded with the decoded message either being displayed, in the case of text or numerals, or enunciated over the pager's speaker, in the case of a voice message. Each pager has a different individual pager identification, which are used to selectively address each of the pagers individually. In addition, pagers 106–110 also may monitor for paging data on different frequencies.

In addition, communications system 100 also includes a data collector 112, which includes a receiver for receiving paging data, and a transmitter unit 114 coupled to a network 116. Network 116 is the medium used to provide communications links between various devices and computers connected together within communications system 100. Network 116 may include permanent connections, such as wire or fiber optic cables, or temporary connections made through telephone connections. In the depicted example, server 118 is employed to control data collector 112 and transmitter unit 114. If transmitter unit 114 is located within an aircraft, the page may be sent to transmitter unit 114 through a radio frequency communications link. Communications system 100 is able to provide a postponed pager service for airlines by monitoring on selected frequencies and monitoring selected identifications for paging data for selected pagers. For example, if a user carrying pager 106 is to travel from one geographic locale to another on an airplane during which the pager must be turned to an off mode, data collector 112 may be directed by server 118 to monitor for the ID associated with pager 106 on the frequency monitored by pager 106 for pages being directed to pager 106. Data collector 112 would record and store any paging data directed towards pager 106 and this paging data would be directed for transmission to pager 106 at a later time. In the meantime, the paging data would be stored in a storage device, such as one of those located within server 118. When the user reaches the destination and is allowed to turn pager 106 to an on mode, server 118 would transmit the pager data for reception by pager 106 through transmitter unit 114. In the depicted example, the transmission of the pages occurs within the aircraft or jetway. If the transmission occurs within the aircraft, a radio frequency transmission may be used to establish a communications link to a transmitter unit located within the aircraft to forward the paging data to the pagers. In such an instance, passengers would be instructed to turn pagers back on to receive any forwarded paging data.

Data collector 112 and transmitter unit 114 may be implemented using known receivers and transmitters that may be programmed to receive and transmit at frequencies used by the receivers, such as pagers 106, 108, 110. These units may be controlled by server 118 or may include a microprocessor and memory, which include instructions and store data to perform the necessary functions for receiving and transmitting paging data.

Figure 2:
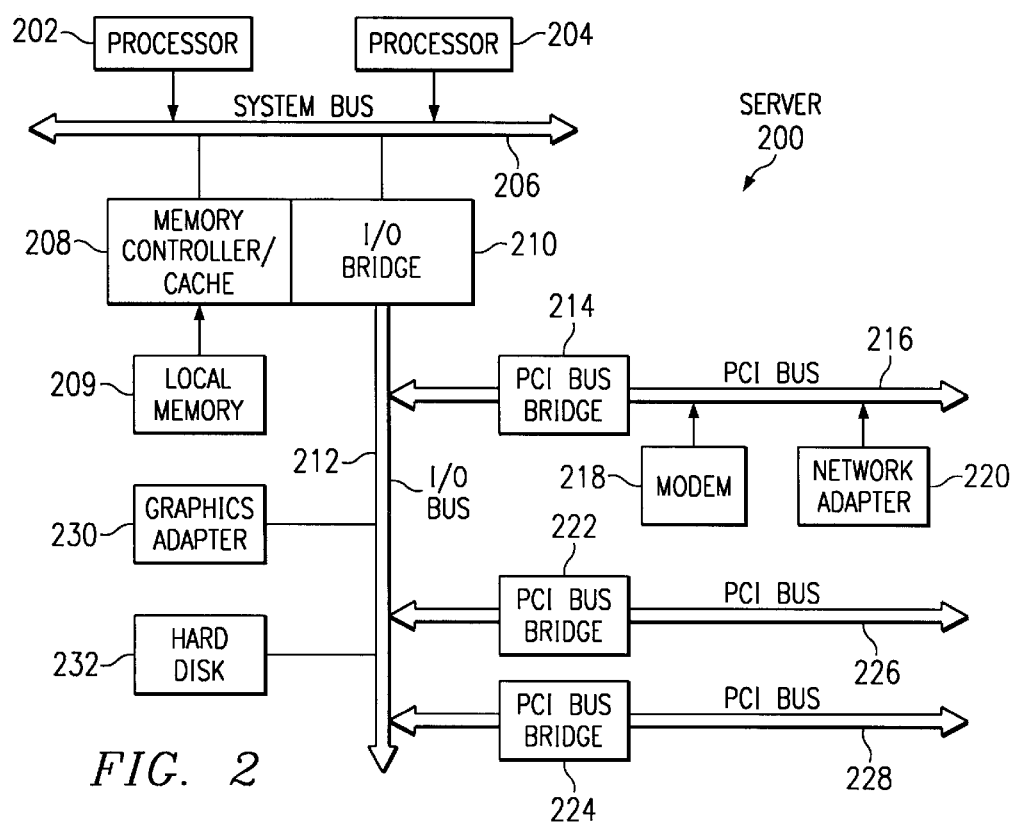
FIG. 2 is a block diagram which depicts a data processing system, which may be implemented as a server, in accordance with a preferred embodiment of the present invention.

Referring to FIG. 2, a block diagram depicts a data processing system, which may be implemented as a server, such as server 118 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to computers may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
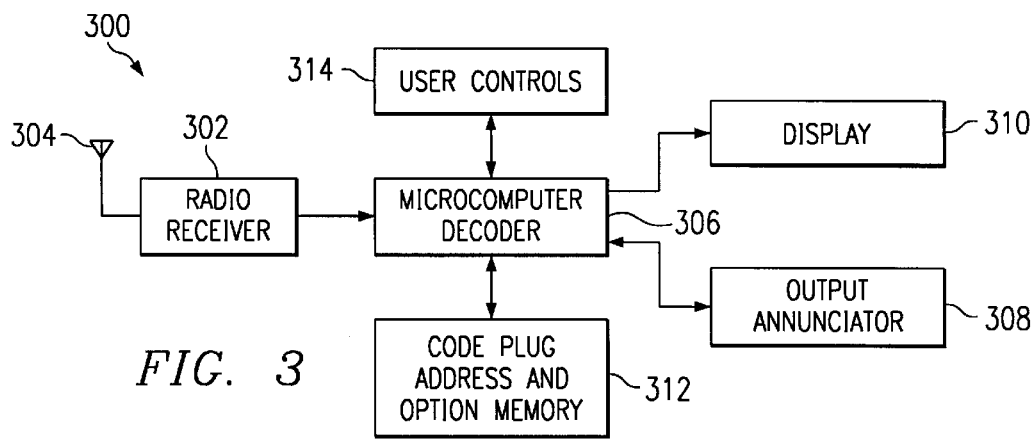
FIG. 3 is a block diagram of a receiver in the form of a pager in accordance with a preferred embodiment of the present invention.

With reference now to FIG. 3, a block diagram of a receiver in the form of a pager is depicted in accordance with a preferred embodiment of the present invention. Receiver 300 is a block diagram of a typical paging receiver. Receiver 300 includes a radio receiver 302, which receives signals via antennae 304. The output of radio receiver 302 is connected to a microcomputer decoder 306. Microcomputer decoder 306 is employed to process the information contained in received signals. In the depicted examples, this information in the received signals may be in the form of data to be displayed on a display or in the form of voice. Microcomputer decoder 306 then communicates with output enunciator 308, display 310 and code plug address and option memory 312.

Microcomputer decoder 306 uses the decoding schemes contained within code plug address and option memory 312 to process pages. In addition, information identifying the identification code to which pager 300 will respond also is stored within code plug address and option memory 312. Pager 300 is powered by a battery (not shown) in this example.

User controls 314 are employed to display or play messages to a user. User controls 314 also may be employed to program other functions provided by pager 300, such as automatic power-up and power-down functions, a clock, as well as turning the pager on and off.

Figure 4:
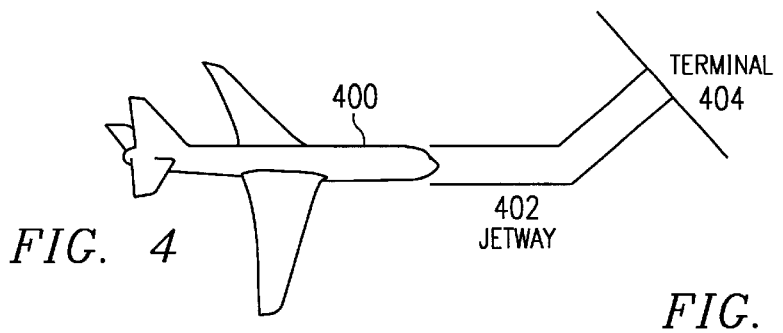
FIG. 4 is a diagram illustrating a scenario in which postponed pager service may be implemented in accordance with a preferred embodiment of the present invention.

With reference now to FIG. 4, a diagram illustrating a scenario in which postponed pager service may be implemented is depicted in accordance with a preferred embodiment of the present invention. In the depicted example, a passenger may register a pager for postponed pager service prior to entering jetway 402 to board aircraft 404, when making a reservation, or when checking in at the terminal. Such a registration may be accomplished using a number of mechanisms. For example, reading of the boarding pass by a device scanning boarding passes may be used to register the pager. Alternatively, a barcode on the pager may be used to provide the necessary information to register the pager for postponed pager service. Other electronic means also may be used.

In the depicted examples, after registration, initiation of monitoring will typically occur when the passenger enters the jetway to board the aircraft. At this time, a data collector, such as data collector 112 in FIG. 1, will monitor for paging data directed towards the registered pagers. The initiation of monitoring for paging data typically occurs when a passenger enters a shielded area in which pages cannot be received or when the passenger is instructed to turn off a pager. When these devices are shielded from receiving pages or turned off, a data collector will monitor for pages directed towards registered pagers and record these pages. These pages may take the form of both data and voice. When aircraft 404 lands at its destination, at some point the passengers will be informed that electronic devices may be turned back on. In accordance with a preferred embodiment of the present invention, pages collected by the data collector are forwarded to the destination airport and are transmitted through a transmitter located within aircraft 404 or jetway 402. If the paging data is transmitted through a transmitter located within the aircraft, the paging data is sent to the transmitter through a radio frequency communications link. In addition, the transmission also may take place within terminal 400 at the destination. If the paging data is transmitted within terminal 400, the terminal typically is shielded to avoid conflict with existing paging systems. In this manner, each user having a registered pager may receive any pages that may have been directed towards the user's pager during the flight.

Figure 5:
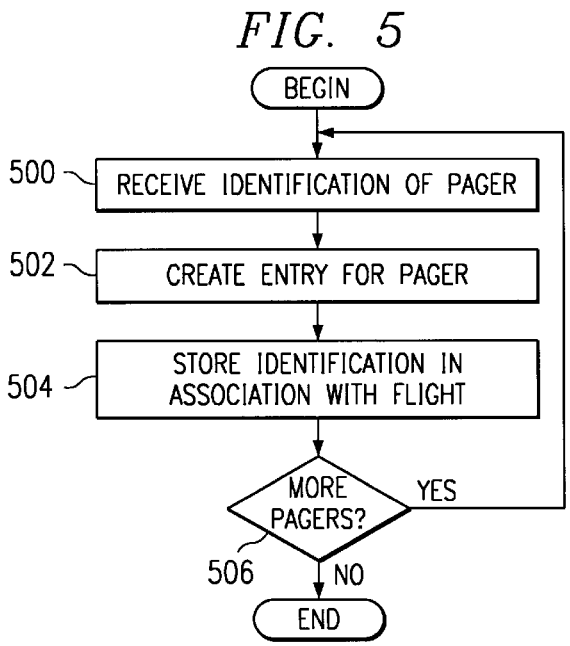
FIG. 5 is a flowchart of a process for registering pagers in accordance with a preferred embodiment of the present invention.

With reference now to FIG. 5, a flowchart of a process for registering pagers is depicted in accordance with a preferred embodiment of the present invention. This process is used to obtain the information needed to monitor for paging data directed towards a registered pager. The process may be implemented in a server computer, such as server 118 in FIG. 1, which may be part of an airline's computer system. This computer system may be implemented using server 200 in FIG. 2 or alternatively may take another form, such as a mainframe computer.

The process begins by receiving identification of the pager (step 500). Thereafter, an entry is created for the pager (step 502) where the identification of the pager is stored in association with the flight (step 504). The information associating pagers with flights may be stored within a storage device, such as hard disk 232 in server 200 in FIG. 2. In the depicted example, this identification includes the frequency at which the pager will monitor for pages and the identification code that activates the pager to decode and store the page. In addition, other information, such as the passenger's name may be associated with the pager. A determination is then made as to whether more pagers are present for registration (step 506). This step is used to register all of the pagers for a flight. In addition, the process may register pagers for all flights handled by a particular server. If more pagers are present, the process returns to step 500. Otherwise the process terminates.

Figure 6:
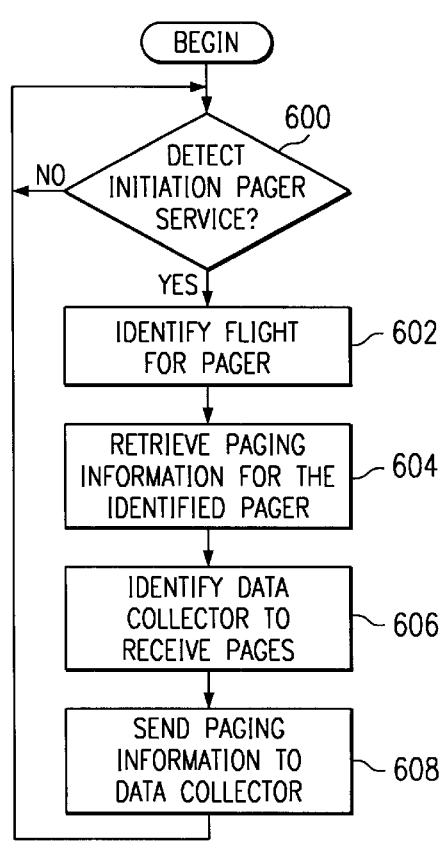
FIG. 6 is a flowchart of a process for receiving pages for a postponed pager service in accordance with a preferred embodiment of the present invention.

With reference now to FIG. 6, a flowchart of a process for receiving pages for a postponed pager service is depicted in accordance with a preferred embodiment of the present invention. The process begins by monitoring for initiation of the postponed pager service for a registered pager (step 600). This determination may be made through a number of different mechanisms. For example, the device may be an electronic boarding pass reader reading a boarding ticket for a passenger who has signed up or indicated that the service for forwarding pages is desired. The process returns to step 600 until an initiation of the postponed pager service is detected.

Upon detecting pager registration, an identification of the flight with which the pager is associated is made (step 602). The identification of this information is made by retrieving stored entries from the storage device in the server. Paging information for the identified pager is retrieved (step 604). This paging information is the information needed by a data collector to monitor for and record paging data directed towards registered pagers for which the postponed paging service has been initiated. For example, information, such as a frequency and address code used by a registered pager, is retrieved.

Then, a data collector is identified to receive pages for registered pagers (step 606). This step may be accomplished by identifying the origination of the flight. A data collector located at the origination is then selected to receive the pages. This data collector may be located at the airport or at some other locale within the geographic region in which pages are expected to be received for registered pagers. Typically, the data collector is located within a geographic region in which the registered pager is able to receive paging data. This geographic region may be within a city, one or more counties, a state, or some other arbitrarily defined geographic region. With global pagers, pagers that are able to receive paging data globally, the data collector may be located anywhere. The paging information is sent to the data collector (step 608) with the process then returning to step 600.

Turning next to FIG. 7, a flowchart of a process for receiving paging data is depicted in accordance with a preferred embodiment of the present invention. This process is employed in a server to receive paging data. The process begins by receiving paging data from the data collector (step 700). A pager is identified for the received paging data (step 702). The paging data is then stored in association with the registration entry for the registered pager (step 704). The paging data is stored at the server in this example for transmission to a transmitter for retransmission to the registered pager after termination. A determination is then made as to whether more paging data is present for reception (step 706). If more paging data is present, the process returns to step 700. Otherwise, the process returns to step 706 until additional paging data is present.

With reference next to FIG. 8, a flowchart for transmitting data is depicted in accordance with a preferred embodiment of the present invention. This process in employed by a server to transmit data when a flight terminates and the pagers belonging to passengers on the flight are ready for receiving postponed pages. The process begins by determining whether paging data is to be retransmitted for a flight (step 800). This determination may be made using the flight schedules and actual flight times of the aircraft. In addition, this indication also may be identified by receiving a signal from personnel on the aircraft that pages are to be retransmitted. If paging data is not to be retransmitted, the process continues to return to step 800. Otherwise, a transmitter unit is identified for the flight (step 802). The identification of the transmitter unit may be performed by correlating a transmitter unit with the destination of the flight. This type of correlation may be performed if the page is to be retransmitted within the jetway or terminal of an airport. If the transmission is to be retransmitted within the body of the aircraft, the transmitter is identified based on the flight number and the aircraft used in the flight. This transmitter unit may be located within the aircraft itself, or within a jetway or a terminal at the destination of the aircraft shielded to prevent interference with existing paging systems.

After identifying a transmitter for the flight, paging data for the pagers is retrieved (step 804). This paging data is sent to the transmitter unit for transmission to the registered pager or pagers (step 806). In addition, a command is sent to the data collector to end collection of paging data for the registered pagers on the flight (step 808) with the process returning to step 800. This step may be accomplished by sending the data collector an identification of pagers or flights for which monitoring and recording of paging data should cease.

Turing now to FIG. 9, a flowchart of a process used by a data collector to receive or record paging data is depicted in accordance with a preferred embodiment of the present invention. The process in FIG. 9 is implemented in a data collector such as data collector 112 in FIG. 1.

The process begins by monitoring for paging data (step 900). The data collector checks for paging data based on the information received from the server. The data collector will check for specific IDs on specific frequencies based on the received data to identify paging data that is to be saved or stored. A determination is made as to whether paging data directed towards pagers that the data collector has been directed to record has been detected (step 902). If such paging data has not been detected, the process returns to step 900. Otherwise, the paging data is recorded and sent to the server (step 904) with the process then returning to step 900.

Turning next to FIG. 10, a flowchart of a process for transmitting postponed pages is depicted in accordance with a preferred embodiment of the present invention. This process is implemented within a transmitter unit, such as transmitter unit 114 in FIG. 1. As mentioned before, this transmitter unit may be placed within the aircraft itself, in a jetway, or at a terminal at the destination of the aircraft.

The process begins by receiving paging information for a pager (step 1000). This information includes the identification of the pager along with the frequency at which the pager monitors for pages. This information will be used to transmit the paging information such that the pager will receive and decode the information for use by the user. Thereafter, the paging data itself is received (step 1002) and the paging data is transmitted (step 1004) with the process terminating thereafter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the processes of the present invention may be implemented in other situations in which a pager is unable to receive paging data. For example, the present invention may be employed in underground trains and subways. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for postponing reception of data by a pager during an airline flight, the method comprising:
    registering a pager prior to a beginning of the airline flight, so that data directed to the pager can be stored;
    associating the pager with flight information;
    responsive to detecting data directed to the pager during the airline flight, storing the data;
    determining whether the airline flight has terminated at a destination based on the flight information; and
    responsive to a determination that the airline flight has terminated at the destination, transmitting the data to the pager at the destination.

2. The method of claim 1, wherein the step of monitoring comprises monitoring for data directed to the pager using a receiver located within a geographic region in which the pager normally receives data.

3. A method for postponing reception of data by a pager during an airline flight, the method comprising:
    registering a pager prior to a beginning of the airline flight, so that data directed to the pager can be stored;
    responsive to detecting data directed to the pager during the airline flight, storing the data; and
    responsive to a termination of the airline flight at a destination, transmitting the data to the pager at the destination, wherein the destination is within the aircraft.

4. A method for postponing reception of data by a pager during an airline flight, the method comprising:
    registering a pager prior to a beginning of the airline flight, so that data directed to the pager can be stored;

responsive to detecting data directed to the pager during the airline flight, storing the data; and responsive to a termination of the airline flight at a destination, transmitting the data to the pager at the destination, wherein the destination is within a jetway.

5. The method of claim 2, wherein the geographic region is a state.

6. The method of claim 2, wherein the geographic region is a city.

7. A method for postponing reception of data by a pager during an airline flight, the method comprising:

registering a pager prior to a beginning of the airline flight, so that data directed to the pager can be stored, wherein an identification code is associated with the pager and wherein a step of monitoring for data directed to the pager comprises monitoring for data containing the identification code to identify data directed towards the pager;

responsive to detecting data directed to the pager during the airline flight, storing the data; and responsive to a termination of the airline flight at a destination, transmitting the data to the pager at the destination.

8. A method for postponing reception of data by a pager during an airline flight, the method comprising:

registering a pager prior to a beginning of the airline flight by reading a bar code prior to the beginning of the flight, wherein the bar code containing information about the pager is associated with the pager;

monitoring for data directed to the pager;

responsive to detecting data directed to the pager, storing the data; and responsive to a termination of the airline flight at a destination, transmitting the data to the pager at the destination.

9. The method of claim 1, wherein the information includes an identification code used by the pager and a frequency monitored by the pager.

10. The method of claim 1, wherein the step of registering comprises:

entering information about the pager into a computer.

11. A method for forwarding data for a receiver to a destination for the receiver, the method comprising:

monitoring for data directed towards a specific receiver in transit to the destination;

responsive to detecting data directed towards the specific receiver, forwarding the information to a transmitter located at the destination; and responsive to the receiver reaching the destination, transmitting the data to the receiver using the transmitter.

12. A data processing system for postponing reception of data by a pager during an airline flight, the data processing system comprising:

registering means for registering a pager prior to a beginning of the airline flight, so that data directed to the pager can be stored;

associating means for associating the pager with flight information;

storing means, responsive to detecting data directed to the pager during the airline flight, for storing the data;

determining means for determining whether the airline flight has terminated at a destination based on the flight information; and transmitting means, responsive to a determination that the airline flight has terminated at the destination, for transmitting the data to the pager at the destination.

13. The data processing system of claim 12, wherein the monitoring means comprises means for monitoring for data directed to the pager using a receiver located within a geographic region in which the pager normally receives data.

14. A data processing system for postponing reception of data by a pager during an airline flight, the data processing system comprising:

registering means for registering a pager prior to a beginning of the airline flight, so that data directed to the pager can be stored;

storing means, responsive to detecting data directed to the pager during the airline flight, for storing the data; and transmitting means, responsive to a termination of the airline flight at a destination, for transmitting the data to the pager at the destination, wherein the destination is within the aircraft.

15. A data processing system for postponing reception of data by a pager during an airline flight, the data processing system comprising:

registering means for registering a pager prior to a beginning of the airline flight, so that data directed to the pager can be stored;

storing means, responsive to detecting data directed to the pager during the airline flight, for storing the data; and transmitting means, responsive to a termination of the airline flight at a destination, for transmitting the data to the pager at the destination, wherein the destination is within a jetway.

16. The data processing system of claim 13, wherein the geographic region is a state.

17. The data processing system of claim 13, wherein the geographic region is a city.

18. A data processing system for postponing reception of data by a pager during an airline flight, the data processing system comprising:

registering means for registering a pager prior to a beginning of the airline flight, so that data directed to the pager can be stored, wherein an identification code is associated with the pager and wherein a step of monitoring for data directed to the pager comprises monitoring for data containing the identification code to identify data directed towards the pager;

storing means, responsive to detecting data directed to the pager during the airline flight, for storing the data; and transmitting means, responsive to a termination of the airline flight at a destination, for transmitting the data to the pager at the destination.

19. A data processing system for postponing reception of data by a pager during an airline flight, the data processing system comprising:

registering means for registering a pager prior to a beginning of the airline flight by reading a bar code prior to the beginning of the flight, wherein the bar code containing information about the pager is associated with the pager;

monitoring means for monitoring for data directed to the pager;

storing means, responsive to detecting data directed to the pager, for storing the data; and transmitting means, responsive to a termination of the airline flight at a destination, for transmitting the data to the pager at the destination.

20. The data processing system of claim 12, wherein the information includes an identification code used by the pager and a frequency monitored by the pager.

21. The data processing system of claim 12, wherein the step of registering comprises:

entering means for entering information about the pager into a computer.

22. A data processing system for forwarding data for a receiver to a destination for the receiver, the data processing system comprising:

monitoring means for monitoring for data directed towards a specific receiver in transit to the destination;

forwarding means, responsive to detecting data directed towards the specific receiver, for forwarding the information to a transmitter located at the destination;

transmitting means, responsive to the receiver reaching the destination, for transmitting the data to the receiver using the transmitter.

23. The data processing system of claim 22, wherein the receiver is a pager.

24. A computer program product in a computer readable medium for postponing reception of data by a pager during an airline flight, the computer program product comprising:

first instructions for registering a pager prior to a beginning of the airline flight, so that data directed to the pager can be stored;

second instructions for associating the pager with flight information;

third instructions, responsive to detecting data directed to the pager during the airline flight, for storing the data;

fourth instructions for determining whether the airline flight has terminated at a destination based on the flight information; and fifth instructions, responsive to a determination that the airline flight has terminated at the destination, for transmitting the data to the pager at the destination.

25. A computer program product in a computer readable medium for forwarding data for a receiver to a destination for the receiver, the computer program product comprising:

first instructions for monitoring for data directed towards a specific receiver in transit to the destination;

second instructions, responsive to detecting data directed towards the specific receiver, for forwarding the information to a transmitter located at the destination;

third instructions, responsive to the receiver reaching the destination, for transmitting the data to the receiver using the transmitter.

* * * * *